United States Patent
Dohner et al.

(10) Patent No.: US 10,428,223 B2
(45) Date of Patent: Oct. 1, 2019

(54) PRETREATMENT HAVING IMPROVED STORAGE STABILITY AND ADHESION

(71) Applicant: SIKA TECHNOLOGY AG, Baar (CH)

(72) Inventors: Reto Dohner, Zürich (CH); Britta Studiger, Winterthur (CH); Wolf-Rüdiger Huck, Gockhausen (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/765,593

(22) PCT Filed: Jan. 30, 2014

(86) PCT No.: PCT/EP2014/051765
§ 371 (c)(1),
(2) Date: Aug. 4, 2015

(87) PCT Pub. No.: WO2014/118259
PCT Pub. Date: Aug. 7, 2014

(65) Prior Publication Data
US 2015/0376417 A1 Dec. 31, 2015

(30) Foreign Application Priority Data

Feb. 4, 2013 (EP) .................................... 13153918

(51) Int. Cl.
| C09D 5/00 | (2006.01) |
| C03C 17/30 | (2006.01) |
| C09D 183/08 | (2006.01) |
| C08G 77/26 | (2006.01) |
| C08G 77/28 | (2006.01) |
| C09D 7/45 | (2018.01) |

(52) U.S. Cl.
CPC .............. C09D 5/002 (2013.01); C03C 17/30 (2013.01); C08G 77/26 (2013.01); C08G 77/28 (2013.01); C09D 7/45 (2018.01); C09D 183/08 (2013.01)

(58) Field of Classification Search
CPC ........ C03C 17/30; C08G 77/26; C08G 77/28; C09D 183/08; C09D 5/002; C09D 7/02
See application file for complete search history.

(56) References Cited

U.S. PATENT DOCUMENTS

| 6,482,523 B1 * | 11/2002 | Morikawa | B32B 27/08 |
| | | | 428/412 |
| 2003/0185990 A1 * | 10/2003 | Bittner | B05D 7/16 |
| | | | 427/385.5 |
| 2008/0188624 A1 * | 8/2008 | Yano | C08K 5/09 |
| | | | 525/342 |
| 2009/0226738 A1 | 9/2009 | Sutter et al. | |
| 2009/0297856 A1 | 12/2009 | Dohner et al. | |

FOREIGN PATENT DOCUMENTS

| CN | 101511928 A | 8/2009 |
| CN | 101583739 A | 11/2009 |
| JP | 2008214507 A | 9/2008 |
| JP | 2010501715 A | 1/2010 |
| JP | 2011516257 A | 5/2011 |
| WO | 2008/025846 A2 | 3/2008 |
| WO | 2008/041976 A2 | 4/2008 |

OTHER PUBLICATIONS

Oct. 8, 2016 Office Action issued in Chinese Patent Application No. 201480007305.3.
Mar. 19, 2014 International Search Report issued in International Patent Application No. PCT/EP2014/051765.
Aug. 13, 2015 International Preliminary Report on Patentability issued in International Patent Application No. PCT/EP2014/051765.
Mar. 6, 2018 Office Action issued in Japanese Application No. 2015-555697.
Apr. 27, 2017 Office Action issued in Chinese Application No. 201480007305.3.
Aug. 21, 2018 Office Action issued in Japanese Application No. 2015-555697.
Oct. 31, 2017 Office Action issued in Japanese Application No. 2015-555697.

* cited by examiner

Primary Examiner — Shuangyi Abu Ali
(74) Attorney, Agent, or Firm — Oliff PLC

(57) ABSTRACT

Embodiments of the present application relate to a composition including A) at least one aminosilane which has at least one hydrolyzable group bonded to Si, B) at least one mercaptosilane which has at least one hydrolyzable group bonded to Si, and C) at least one emulsifier selected from pyrrolidones, propionamides and amino alcohol reaction products, wherein, if at least one amino alcohol reaction product is used as an emulsifier, an amino alcohol and at least part of the aminosilane and/or mercaptosilane are contained in the form of an amino alcohol reaction product, in which at least some of the hydrolyzable groups present in the at least one aminosilane and the at least one mercaptosilane are replaced by the amino alcoholate group of the amino alcohol, D) and/or hydrolysis and/or condensation products of the silanes contained.

20 Claims, No Drawings

PRETREATMENT HAVING IMPROVED STORAGE STABILITY AND ADHESION

TECHNICAL FIELD

The invention relates to a composition, especially an aqueous one- or two-component composition which is suitable as an adhesive promoter composition, a method for producing the composition and the use thereof.

PRIOR ART

Adhesive bonding is a widely used joining technology. However, in this context some substrates can be problematic, since they cannot undergo adequate adhesion, or any adhesion at all, with certain adhesives. Adhesive promoter compositions have long been used to improve adhesion. One particularly important application area of adhesive promoter compositions is vehicle manufacturing, especially in direct glazing, i.e., the bonding of windshields with vehicle bodies.

Typically such compositions are based on organosilanes. In particular, adhesive promoter compositions are used as primers, i.e., as adhesion-improving undercoat. Compositions or primers of this type often contain inert volatile solvents to ensure rapid flashing off. However, the organic solvent content is undesirable in terms of environmental compatibility and occupational safety.

Aqueous adhesive promoter compositions based on organosilanes are known. However, they have some drawbacks. One problem with silane-based aqueous adhesive promoter compositions is their relatively low storage stability with adequate reactivity or their inadequate reactivity with adequate stability. The silanes used contain hydrolyzable groups that hydrolyze when mixed with water to form silanol groups (Si—OH). Such silanol groups are frequently reactive and condense spontaneously with one another to form high molecular weight condensation products.

In addition, the use of aminosilanes and/or mercaptosilanes in such aqueous adhesive promoter compositions is known. The emulsification of mercaptosilane or aminosilane-mercaptosilane mixtures in water is particularly difficult, since the mercaptosilanes are not water-soluble before the silanes are hydrolyzed. To mix these silanes with water, complete, homogenous distribution must be ensured before hydrolysis. In addition, the water must be adjusted with acids, e.g., acetic acid, in such a manner that the condensation occurring as a subsequent reaction is slowed down. Up to now it has not been possible to improve the miscibility or slow down the hydrolysis to such an extent that a "normal" mixing process, i.e., one that takes a few minutes, could be used. Therefore, the silanes and the water must be rapidly mixed homogeneously, which requires special mixing equipment.

This means that aqueous adhesive promoter compositions have been sold as 2-component systems (e.g., Sika Hydro-Pree-100 from Sika Schweiz AG) up to now and an on-site mixing process is necessary to mix the two components before use. It is important that the two components are mixed rapidly and homogeneously under very strong turbulences. An apparatus specially developed for this purpose ("shaker") is necessary. After preparation, the final mixed product has storage stability ("pot life") of no more than 30 days.

PRESENTATION OF THE INVENTION

The object of the present invention is therefore to provide silane-based aqueous adhesive promoter compositions having improved storage stability, so that the aqueous compositions can also be sold as one-component aqueous adhesive promoter systems. Furthermore, easier mixing without special mixing equipment should be possible.

Surprisingly, it has now been found that the use of special emulsifiers can achieve distinct improvement in the storage stability of the aqueous compositions. These emulsifiers are special cyclic or linear carboxylic acid amide or amino alcohol reaction products, in which an amino alcohol is used in the form of a reaction product of amino alcohol and the silanes as an "integrated" emulsifier.

Accordingly, the invention relates to a composition comprising
A) at least one aminosilane having at least one hydrolyzable group bonded to Si,
B) at least one mercaptosilane having at least one hydrolyzable group bonded to Si, and
C) at least one emulsifier selected from pyrrolidones, propionamides and amino alcohol reaction products,
wherein, if at least one amino alcohol reaction product is used as the emulsifier, an amino alcohol and at least part of the aminosilane and/or mercaptosilane is contained in the form of an amino alcohol reaction product, wherein at least some of the hydrolyzable groups present in the at least one aminosilane and the at least one mercaptosilane are replaced by the amino alcoholate group of the amino alcohol,
D) and/or hydrolysis or condensation products of the contained silanes. The composition is particularly preferably used as a one- or two-component aqueous composition, e.g., as an adhesive promoter, wherein the one-component aqueous composition is particularly preferred.

Surprisingly, it was found that extremely storage-stable aqueous compositions can be formulated with the compositions according to the invention. The aqueous compositions or adhesive promoter compositions formed can have a shelf life of 12 months. In addition, unexpectedly an improved miscibility of the reactive components in water is seen, which markedly simplifies the mixing process and enables production in a standard reactor without problems. The invention thus enables easier handling, since the product can be offered as a 1-component system and no longer as a complicated 2-component system. The invention meets the need to be able to offer an aqueous 1-component system.

Moreover, the behavior of the aqueous composition in terms of adhesive properties and heat stability of the cured bond is improved. The aqueous composition is generally suitable as a reactive, invisible adhesion pretreatment for substrates, especially glass and glass ceramics, or for direct glazing in vehicle manufacturing as a pretreatment for bonding, especially with polyurethane adhesives, preferably 1K polyurethane adhesives.

Method of Implementing the Invention

In the present document the terms "silane" and "organosilane" designate compounds that on one hand have at least one, generally two or three, hydrolyzable groups, especially alkoxy groups or acyloxy groups, bonded directly to the silicon atom, preferably via Si—O-bonds, and on the other hand at least one organic radical bonded directly to the silicon atom via a Si—C bond. Such silanes with alkoxy or acyloxy groups are also known to the person skilled in the art as organoalkoxysilanes or organoacyloxysilanes.

It is a characteristic of the silanes to hydrolyze upon contact with moisture. In this process, organosilanols form, i.e., organosilicon compounds containing one or more silanol groups (Si—OH groups) and, by subsequent condensation reactions, organosiloxanes, i.e., organosilicon compounds containing one or more siloxane groups (Si—O—Si groups).

The tell "aminosilanes" and "mercaptosilanes" designate organosilanes in which the organic radical contains an amino group or a mercapto group. "Primary aminosilanes" designates aminosilanes having a primary amino group, thus a $NH_2$ group bonded to an organic residue. The term "secondary aminosilanes" designates aminosilanes having a secondary amino group, thus a NH group bonded to two organic radicals.

A hydrolyzable group bonded to Si is a group that can be hydrolyzed to form a silanol group by hydrolysis, optionally in the presence of a catalyst. Hydrolysis products are silanes, the hydrolyzable groups of which are at least partially hydrolyzed, i.e., at least some of the hydrolyzable groups are replaced by an OH group. Condensation products include condensates of two or more such hydrolyzed silanes. These hydrolysis and condensation products of silanes are known to the person skilled in the art.

The term "independently of one another" here also always means independently of one another in the same molecule, if various possibilities exist.

One or more aminosilanes and one or more mercaptosilanes can be used for the composition. The aminosilanes and mercaptosilanes each have at least one hydrolyzable group bonded to Si. These can be any usual hydrolyzable groups, wherein alkoxy groups and acyloxy groups are preferred and $C_1$-$C_4$-alkoxy groups are particularly preferred. After mixing with water, hydrolysis of the hydrolyzable groups can take place over time. Then, hydrolysis products result, in which at least some of the hydrolyzable groups are replaced by OH groups. In subsequent reactions, condensation products can form in the hydrolysis products via the silanol groups formed.

The aminosilane having at least hydrolyzable group bonded to Si is preferably an aminosilane of Formula (I) below. The mercaptosilane having at least one hydrolyzable group bonded to Si is preferably a mercaptosilane of Formula (II) below.

wherein in Formulas (I) and (II)
$R^1$ represents an n-valent organic radical with at least one primary and/or secondary amino group,
$R^{1'}$ represents an m-valent organic radical with at least one mercapto group,
$R^2$ and $R^{2'}$ independently of one another represent an alkyl group with 1 to 4 C atoms or an acyl group such as acetyl, wherein an alkyl group with 1 to 4 C atoms or an acyl group such as acetyl is preferred and methyl and ethyl are particularly preferred;
$R^3$ and $R^{3'}$ independently of one another represent H or an alkyl group with 1 to 10 C atoms; a and b independently of one another represent a value of 0, 1 or 2, wherein a and b independently of one another are preferably 0 or 1 and particularly preferably 0; and n and m independently of one another represent the values 1, 2, 3 and 4.

The groups ($OR^2$) and ($OR^{2'}$) in Formulas (I) and (II) represent the hydrolyzable group. In hydrolysis products of these silanes, these groups ($OR^2$) and ($OR^{2'}$) are at least partially replaced by OH.

Preferred are amino-functional organoalkoxysilanes, i.e., aminosilanes of Formula (I), in which $R^2$ represents an alkyl group with 1 to 4 C-atoms, wherein amino-functional organomethoxysilanes ($R^2$=methyl) and amino-functional organoethoxysilanes ($R^2$=ethyl) are particularly preferred. Aminosilanes with three alkoxy groups (a=0), especially with three methoxy groups, have proven especially advantageous.

Especially suitable aminosilanes are those selected from the group consisting of 3-aminopropyl-trimethoxysilane, 3-aminopropyl-dimethoxymethylsilane, 3-amino-2-methylpropyl-trimethoxysilane, 4-aminobutyl-trimethoxysilane, 4-aminobutyl-dimethoxymethylsilane, 4-amino-3-methylbutyl-trimethoxysilane, 4-amino-3,3-dimethyl butyl-trimethoxysilane, 4-amino-3,3-dimethylbutyl-dimethoxymethylsilane, 2-aminoethyl-trimethoxysilane, 2-aminoethyl-dimethoxymethylsilane, aminomethyl-trimethoxysilane, aminomethyl-dimethoxymethylsilane, aminomethyl-methoxydimethylsilane, N-methyl-3-aminopropyl-trimethoxysilane, N-ethyl-3-aminopropyl-trimethoxysilane, N-butyl-3-amino-propyl-trimethoxysilane, N-cyclohexyl-3-aminopropyl-trimethoxysilane, N-phenyl-3-aminopropyl-trimethoxysilane, N-methyl-3-amino-2-methylpropyl-trimethoxysilane, N-ethyl-3-amino-2-methylpropyl-trimethoxysilane, N-ethyl-3-aminopropyl-dimethoxymethylsilane, N-phenyl-4-aminobutyl-trimethoxysilane, N-phenyl-aminomethyl-dimethoxymethylsilane, N-cyclohexyl-aminomethyl-dimethoxymethylsilane, N-methyl-aminomethyl-dimethoxymethylsilane, N-ethyl-aminomethyl-dimethoxymethylsilane, N-propyl-aminomethyl-dimethoxymethylsilane, N-butyl-aminomethyl-dimethoxymethylsilan; N-(2-aminoethyl)-3-aminopropyl-trimethoxysilane, 3-[2-(2-aminoethylamino)-ethylamino]-propyl-trimethoxysilane, bis(trimethoxysilylpropyl)amine, as well as the analogs thereof with three ethoxy or three isopropoxy groups in place of the three methoxy groups on the silicon.

In one embodiment the aminosilane of Formula (I) is an aminosilane of Formula (V)

wherein $R^5$ represents a linear or branched alkylene group with 1 to 6 C atoms, especially propylene, and the other substituents and indices are as defined in Formula (I). Particularly preferred in this instance is 3-aminopropyl-trimethoxysilane.

In a preferred embodiment, the aminosilane of Formula (I) has secondary amino groups, which are especially aminosilanes of Formula (VI) or (VII) or (VIII).

wherein $R^5$ represents a linear or branched alkylene group with 1 to 6 C atoms, especially propylene, and the other substituents and indices are as defined in Formula (I). N-(2-aminoethyl)-3-aminopropyl-trimethoxysilane, 3-[2-(2-amino-ethylamino)-ethylamino]-propyl-trimethoxysilan and bis(trimethoxysilylpropyl)amine have proved particularly preferred.

It has proven to be particularly advantageous if two or more aminosilanes of Formula (I) are present in the composition, preferably if at least one of them is an aminosilane of Formula (VI). A particularly preferred combination is an aminosilane of Formula (VI) and an aminosilane of Formula (VIII) in the composition.

The mercaptosilane having at least one hydrolyzable group bonded to Si is preferably at least one mercaptosilane of Formula (II) described above. Particularly preferred are mercapto-functional organoalkoxysilanes, i.e., mercaptosilanes of Formula (II), in which $R^{2'}$ represents an alkyl group with 1 to 4 C atoms. Particularly preferred are mercapto-functional organomethoxysilanes ($R^{2'}$=methyl) and mercapto-functional organoethoxysilanes ($R^{2'}$=ethyl). Mercaptosilanes with three alkoxy groups (b=0), especially three methoxy groups, proved especially advantageous.

The mercaptosilane of Formula (II) preferably has the Formula (IX)

$$HS\text{—}R^{5'}\text{—}Si(OR^{2'})_{(3-b)}(R^{3'})_b \qquad (IX)$$

wherein $R^{5'}$ represents a linear or branched alkylene group with 1 to 6 C atoms, especially propylene, wherein the other substituents and indices are defined as in Formula (II).

Particularly preferred mercaptosilanes are 3-mercaptopropyl-trimethoxysilane and 3-mercaptopropyltriethoxysilane.

The composition also comprises at least one emulsifier selected from pyrrolidones, propionamides and amino alcohol reaction products. Pyrrolidones are cyclic carboxylic acid amides, and propionamides are linear carboxylic acid amides. Amino alcohols are used in the composition as an integrated emulsifier in the form of a reaction product with at least one part of the aminosilane and/or mercaptosilane. The use of pyrrolidones or amino alcohol reaction products is preferred. The emulsifiers produce better miscibility with water and slower condensation reactions after addition of water.

The applicable pyrrolidones are especially 2-pyrrolidones. 2-pyrrolidones are cyclic carboxylic acid amides. The applicable pyrrolidone can be 2-pyrrolidone, also called γ-butyrolactam, or a derivative of 2-pyrrolidone having a substituent on at least one of the three methylene ring groups and/or at the nitrogen atom. Suitable substituents at the nitrogen atom are alkyl, e.g., $C_{1-12}$-alkyl, preferably $C_1$-$C_7$-alkyl, particularly preferably $C_1$-$C_4$-alkyl, especially methyl or ethyl, or cycloalkyl, preferably cyclopentyl and cyclohexyl, especially cyclohexyl. Suitable substituents at the methylene group are, e.g., alkyl, preferably $C_1$-$C_4$-alkyl, especially methyl or ethyl.

N-substituted 2-pyrrolidones are preferred. Optionally, they may be substituted at at least one methylene ring group, although this is not preferred. Examples are N—$C_1$-$C_{12}$-alkyl-2-pyrrolidone and polyvinylpyrrolidone. Examples of compounds with longer-chain alkyl groups are 1-octyl-2-pyrrolidone and 1-dodecylpyrrolidone. Particularly preferred are N—$C_1$-$C_7$-alkyl-2-pyrrolidone or N—$C_1$-$C_6$-alkyl-2-pyrrolidone, especially N—$C_1$-$C_4$-alkyl-2-pyrrolidone, and N-cycloalkyl-2-pyrrolidone, such as N-cyclohexyl-2-pyrrolidone. Most preferred are N-methyl-2-pyrrolidone (NMP), N-ethyl-2-pyrrolidone (NEP) and especially N-cyclohexyl-2-pyrrolidone (CHP).

Suitable propionamides are propionamide itself and derivatives of propionamide. Examples of suitable propionamides are propionamides of the formula

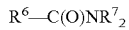

wherein $R^6$ is a substituted or unsubstituted ethyl group and $R^7$ independently of one another is H or a $C_{1-4}$-alkyl group, especially methyl or ethyl. Preferably, at least one group $R^7$ is a $C_{1-4}$-alkyl group and particularly preferably both groups $R^7$ are a $C_{1-4}$-alkyl group, wherein methyl and ethyl groups are preferred.

The group $R^6$ can preferably have at least one substituent and especially exactly one substituent at the ethyl group. The substituent is preferably located at the terminal end of the ethyl group, i.e., at the C3 atom of propionamide. Examples of suitable substituents are $C_1$-$C_4$-alkoxy groups, such as methoxy, ethoxy, propoxy and butoxy.

Specific examples are 3-methoxy-N,N-dimethylpropionamide and 3-butoxy-N,N-dimethylpropionamide.

The amino alcohol with which the amino alcohol reaction product is formed is a compound having at least one amino group and at least one hydroxy group. The amino alcohol can contain, e.g., one or two hydroxy groups, wherein one hydroxy group is preferred. The amino alcohol can have, e.g., one, two or more amino groups, wherein the amino groups may be, e.g., primary or secondary amino groups.

Examples of amino alcohols suitable as emulsifier precursors for forming the amino alcohol reaction product are ethanolamine, diethylene glycol amine, N-(β-aminoethyl) aminoethanol, diethanolamine and N-methyldiethanolamine, wherein diethylene glycol amine is most preferred. Diethylene glycol amine is also known as 2-(2-aminoethoxy)ethanol.

If at least one amino alcohol reaction product is used as emulsifier, the amino alcohol and at least part of the aminosilane and/or the mercaptosilane are contained in the form of a reaction product in which at least some of the hydrolyzable groups present in the at least one aminosilane and the at least one mercaptosilane are replaced by the amino alcoholate group of the amino alcohol.

The reaction product is obtained by transesterification or esterification of at least some of the hydrolyzable groups bonded to Si in the silanes contained in the composition with the amino alcohol.

The degree of transesterification or esterification can be selected within a broad range. Alternatively, all of the hydrolyzable groups of the aminosilanes and/or mercaptosilanes bonded to Si contained in the composition may be replaced by the amino alcoholate group. Preferably, the degree of transesterification or esterification is selected such that, based on the total amount of the silanes contained in the composition, the molar ratio of the hydrolyzable groups bonded to Si and the amino alcoholate groups bonded to Si present in the silanes is in the range of 1:1 to 10:1, preferably from 10:5 to 10:2.

If, for example, in the case of a silane with three hydrolyzable groups (e.g., methoxy), one hydrolyzable group is replaced by an amino alcoholate group, the reaction product contains two hydrolyzable groups and one amino alcoholate group. The molar ratio of the hydrolyzable groups bonded to Si (2) and the amino alcoholate groups bonded to Si (1) to the amino alcoholate groups bonded to Si (1) would then be 3:1. Although, in principle, the amino alcoholate group is a hydrolyzable group also, this will not be considered here.

It is appreciated that this molar ratio is based on the composition before hydrolysis and/or condensation reactions have occurred. It is appreciated further that a composition containing the reaction product described can be a mixture of different compounds, e.g., unreacted aminosilanes or mercaptosilanes and aminosilanes and/or mercaptosilanes having one, two or three amino alcoholate groups. Therefore, the molar ratios mentioned above are to be understood to represent mean values. Upon the addition of water, additionally, hydrolysis and/or condensation products can then form.

Aminosilanes and/or mercaptosilanes having amino alcoholate groups as a result of transesterification or esterification will also be understood as aminosilanes or mercaptosilanes herein. The method of producing the mixtures or the reaction products will be explained in further detail below.

In a preferred embodiment an additional emulsifier selected from pyrrolidones and propionamides, preferably pyrrolidones, especially N-cyclohexyl-2-pyrrolidone, is additionally added to the composition containing the amino alcohol reaction product. In this way the miscibility of the composition and the storage stability of the resulting aqueous composition can be further increased.

Optionally, the composition may also contain at least one tetraalkoxysilane of Formula (IV)

$$Si(OR^4)_4 \quad (IV)$$

wherein $R^4$ independently of one another represents an alkyl group with 1 to 4 C atoms or an acyl group, especially an acetyl group. Tetraalkoxysilanes of this type are, for example, tetramethoxysilane, tetraethoxysilane, tetraisopropoxysilane, tetrapropoxysilane, tetrabutoxysilane and tetraacetoxysilane. Tetraethoxysilane is particularly preferred. As with the aminosilanes and mercaptosilanes, the tetraalkoxysilanes may hydrolyze in the presence of water and optionally condense with other silanes.

In a preferred embodiment, the composition is an aqueous composition or adhesive promoter composition, i.e., the composition also comprises water. It may be a one-component or two-component aqueous adhesive promoter composition, wherein it is particularly preferably a one-component aqueous adhesive promoter composition.

In the preferred one-component aqueous adhesive promoter composition the above described silanes, emulsifiers or the amino alcohol reaction product and water are present in the single component. The two-component aqueous adhesive promoter composition consists of a silane component A, which contains the above-described silanes, emulsifiers or the amino alcohol reaction product, and an aqueous component B, which contains water. The one-component aqueous adhesive promoter composition is characterized by excellent storage stability.

When water is added to the silane-containing composition, the silanes can be hydrolyzed and/or condensed over time, usually within a few minutes. The composition can then, in addition to the silanes contained therein, also contain hydrolysis and/or condensation products of these silanes or, if the reaction has progressed further, may optionally contain only hydrolysis and/or condensation products of the resulting silanes as described above.

The one- or two-component composition may contain additional optional components in addition to water. Such additional components are, e.g., surfactants, acids, adhesive promoter additives, catalysts, co-solvents, biocides, anti-settling agents, stabilizers, inhibitors, pigments, dyes, anticorrosion agents, fragrances, UV indicators, thixotropic agents, fillers, defoamers, other organosilanes and titanates.

Acids are preferred additional components of the one- or two-component aqueous composition. The acid may be an organic or inorganic acid. Organic acids include, on the one hand, carboxylic acids, especially a carboxylic acid selected from group comprising formic, acetic, propionic, trifluoroacetic, oxalic, malonic, succinic, maleic, fumaric and citric acid as well as amino acids, especially aspartic acid and glutamic acid. Acetic acid is preferred as the carboxylic acid.

Organic acids on the other hand are especially those that contain a sulfur atom or a phosphorus atom. Such organic acids are especially organic sulfonic acids. Organic sulfonic acids are understood to be compounds having an organic radical containing carbon atoms and at least one —SO₃H functional group. Aromatic sulfonic acids are preferred.

The aromatic sulfonic acid may be mononuclear or polynuclear, and one or more sulfonic acid groups may be present. For example, these may be 1- or 2-naphthalenesulfonic acid, 1,5-naphthalenedisulfonic acid, benzenesulfonic acid or alkylbenzenesulfonic acids. Preferred aromatic sulfonic acids are those of Formula (X)

in which R represents an alkyl radical with 1 to 18 atoms. Preferably, R represents a methyl or dodecyl group, especially a dodecyl group.

Furthermore, the acid can be an inorganic acid. Suitable inorganic acids are, e.g., those that contain a sulfur atom or a phosphorus atom. Acids containing phosphorus atoms are especially phosphoric acid, phosphorous acid, phosphonic acid and phosphonous acid. Acids containing sulfur atoms are especially sulfuric acids, especially sulfuric acid, sulfurous acids, persulfuric acid, disulfuric acid (=pyrosulfuric acid), disulfurous acid, dithionic acid, dithionous acid, thiosulfuric acid or thiosulfurous acid.

Preferred are acids that have a $pK_a$ between 4.0 and 5. The chemist defines $pK_a$ as the negative base-ten logarithm of the acid dissociation constant $K_a$: $pK_a = -\log_{10} K_a$.

Furthermore, surfactants are preferred additional components of the one- or two-component aqueous adhesive promoter composition. Surfactants used may be natural or synthetic substances which, in solution, decrease the surface tension of water or other liquids. The surfactants, also known as wetting agents, used may be anionic, cationic, nonionic or ampholytic surfactants, or mixtures thereof.

Examples of anionic surfactants are those containing carboxylate, sulfate, phosphate or sulfonate groups, for example amino acid derivatives, fatty alcohol ether sulfates, fatty alcohol sulfates, soaps, alkylphenol ethoxylates, fatty alcohol ethoxylates, but also alkane sulfonates, olefin sulfonates or alkyl phosphates.

The nonionic surfactants, the so-called nonionics, include, e.g., ethoxylates, such as ethoxylated addition products of alcohols, such as, for example, polyoxyalkylene polyols, amines, fatty acids, fatty acid amides, alkylphenols, ethanolamides, fatty amines, poly-siloxanes or fatty acid esters, but also alkyl or alkylphenyl polyglycol ethers, such as, e.g., fatty alcohol polyglycol ether, or fatty acid amides, alkyl glycosides, sugar esters, sorbitan esters, polysorbates or trialkylamine oxides, but also esters and amides of poly (meth)acrylic acids with polyalkylene glycols or aminopolyalkylene glycols, which at most may be terminated with alkyl groups on one end.

Examples of cationic surfactants are quaternary ammonium or phosphonium compounds, such as, for example, tetraalkylammonium salts, N-,N-dialkylimidazoline compounds, dimethyldistearyl ammonium compounds, or N-alkylpyridine compounds, especially ammonium chlorides. The ampholytic or amphoteric surfactants include amphoteric electrolytes, so-called ampholytes, for example aminocarboxylic acids, and betaines.

Surfactants of these types are widely available commercially. Particularly suitable are alkoxylated alcohols, alkoxylated nonionic fluoro surfactants, especially Zonyl® FSO-100, which is commercially available from ABCR, Germany, alkoxylated alcohols or alkoxylated alkylphenols, especially Antarox FM 33, which is commercially available from Rhodia. In addition, alkoxylated fatty alcohols, such as Hydropalat® 120 from Cognis, are preferred. Particularly preferably Hydropalat® 3037 from Cognis is used as surfactant.

Another preferably used optional component is a water-soluble adhesive promoter additive, especially a water-soluble amine-containing adhesive promoter additive. The use of water-soluble adhesive promoter additives generally improves the adhesion performance. Such adhesive promoter additives are frequently bases or aqueous silanes, which may also contain basic groups such as amines. The pH of the composition may optionally be adjusted by adding more acid, e.g., acetic acid. Water-soluble adhesive promoter additives are commercially available.

Examples of suitable water-soluble adhesive promoter additives are reactive organofunctional siloxane oligomers and amine bases. Examples are amino siloxanes and tetramethyl guanidine. The degree of condensations of the amino siloxanes may differ. They can be dimers, trimers or oligomers made of four or more monomeric silanes or mixtures thereof. Such amino siloxanes are also commercially available, e.g., as Dynasylan® HDYROSIL 2627, Dynasylan® HDYROSIL 2776 or Dynasylan® HDYROSIL 2929 from Degussa AG, Germany.

Co-solvents are defined as solvents miscible with water such as alcohol or ethers or ketones. However, it is preferred for such solvents be used only in a small quantity, i.e., typically less than 10 wt.-% based on the water. Particularly preferably, the composition—aside from traces of alcohols resulting from the hydrolysis of the alkoxysilanes used in the aqueous composition—is free from such co-solvents. If a larger amount of solvent is used, the VOC problem increases again; avoidance of this problem is one of the main reasons for using aqueous compositions.

In a preferred embodiment the one- or two-component aqueous composition comprises at least one acid, preferably an organic acid, wherein the acid in the two-component composition is present in der aqueous component B. In another preferred embodiment the one- or two-component aqueous composition comprises at least one surfactant, wherein in the two-component composition the surfactant is contained in the silane component A and/or in the aqueous component B. It is preferred that at least one surfactant is present in the aqueous component B. Optionally, a surfactant may also be contained in the silane component A. In another preferred embodiment the one- or two-component aqueous composition also comprises at least one water-soluble adhesive promoter additive, preferably an amine-containing water-soluble adhesive promoter additive, wherein in the two-component composition the water-soluble adhesive promoter additive is contained in the aqueous component B.

A particularly preferred embodiment is a one-component aqueous composition or adhesive promoter composition that comprises an acid, preferably an organic acid, at least one surfactant and optionally a water-soluble adhesive promoter additive, preferably an amine-containing water-soluble adhesive promoter additive.

The preferred one-component aqueous composition can advantageously be obtained by mixing the silane component A and the aqueous component B of the two-component aqueous composition as described above.

If the emulsifier used is selected from pyrrolidones or propionamides, the quantitative fraction of the emulsifier selected from pyrrolidones or propionamides, based on the total weight of the one- or two-component composition, is in the range of 0.1 to 10 wt.-%, preferably 0.5 to 2 wt.-%.

In the aqueous composition the weight fraction of the sum of aminosilanes, mercaptosilanes and water and, if present, tetraalkoxysilanes of Formula (IV) preferably amounts to more than 80 wt.-%, especially more than 90 wt.-%, based on the total weight of the one- or two-component composition.

The weight fraction of the sum of aminosilanes, mercaptosilanes and, if present, tetraalkoxysilanes of Formula (IV) amounts to, e.g., more than 0.1 wt.-%, especially from 0.1 to 10 wt.-%, preferably from 0.1 to 5 wt.-% and particularly preferably from 0.5 to 2 wt.-%, based on the total weight of the one- or two-component composition.

The weight ratio of the sum of aminosilanes to mercaptosilanes in the composition preferably amounts to 1:10 to 10:1, especially 1:1 to 10:1, preferably 5:2 to 15:2.

It is appreciated that the above-mentioned weight ratios are based on the initial composition, i.e., before the occurrence of hydrolysis and/or condensation reactions.

The composition according to the invention is preferably produced by a method comprising the step of mixing a) at least one aminosilane having at least one hydrolyzable group bonded to Si, b) at least one mercaptosilane having at least one hydrolyzable group bonded to Si, and c) at least one compound selected from pyrrolidones, propionamides and amino alcohols as emulsifier or emulsifier precursor.

If the emulsifier is selected from pyrrolidones and propionamides, mixing results in a composition that is already suitable as silane component A. The mixing can take place at room temperature, e.g., 23° C. Optionally and preferably, in addition, at least one surfactant can be added to the mixture. Optionally, other silanes or usual components as described above may also be added.

If at least one amino alcohol, preferably diethylene glycol amine, is added as emulsifier precursor, the resulting mixture is heated to react the amino alcohol with the aminosilane and/or the mercaptosilane by transesterification or esterification with formation of an amino alcohol reaction product in which at least some of the hydrolyzable groups present in the at least one aminosilane and the at least one mercaptosilane are replaced by the amino alcoholate group of the amino alcohol, and in byproduct formed during the reaction are removed from the mixture.

The byproduct is the protonated hydrolyzable group, preferably an alcohol. The removal of the byproduct can be done in the usual way, e.g., by distillation. If necessary, the distillation may also take place under vacuum.

The reaction is preferably a transesterification, i.e., alkoxy groups bonded to Si are replaced by amino alcoholate groups. Particularly preferably the alkoxy groups are methoxy groups, since the methanol formed can be easily distilled off.

The reaction takes place, e.g., at a temperature of more than 30° C., preferably more than 50° C., more preferably more than 70° C., e.g., about 90° C. The byproduct formed, especially alcohol, is preferably removed by distillation. As soon as the total amount of byproduct such as alcohol has been removed, the reaction mixture is cooled to room temperature. The reaction preferably takes place under a nitrogen atmosphere or under vacuum.

The resulting composition after cooling contains the reaction product and is already suitable as silane component A. Optionally, at least one surfactant, additional silanes or the usual components as described above may be added. Typically, however, this is not preferred. However, in a preferred embodiment, an additional emulsifier selected from pyrrolidones and propionamides, preferably pyrrolidones, especially N-cyclohexyl-2-pyrrolidone, may be added to the composition containing the reaction product.

For the reaction, the ratio of the amount of amino alcohol used to the total amount of aminosilanes and mercaptosilanes used can be varied according to the desired degree of transesterification or esterification. For producing the reaction product, the ratio of the total amount of aminosilanes and mercaptosilanes used to the amount of amino alcohol used is preferably selected such that the molar ratio of hydrolyzable groups bonded to Si present in the at least one aminosilane and the at least one mercaptosilane to the hydroxyl groups present in the amino alcohol is in the range of 1:1 to 10:1, preferably from 10:5 to 10:2. In a particularly preferred embodiment, approximately every third hydrolyzable group of the silanes, preferably an alkoxy group, particularly preferably a methoxy group, is transesterified by the amino alcohol.

The preferred one-component aqueous composition is preferably produced as follows. First, a vessel is charged with water, and then preferably additional components, such as at least one surfactant and at least one acid and optionally a water-soluble adhesive promoter additive are added with stirring. The addition is advantageously performed at room temperature; optionally, the stirring process may also take place at elevated temperature.

The additional components are preferably added successively, and before the next constituent is added, the mixture is preferably stirred until the component has been dissolved in water or is homogeneously distributed. The order of addition of the possible additional components is arbitrary, but preferably, if used, first at least one surfactant, then at least one acid and finally at least one water-soluble adhesive promoter additive are added.

To the aqueous component obtained in this manner, which preferably contains at least one surfactant, at least one acid and optionally a water-soluble adhesive promoter additive, the composition containing the emulsifier selected from pyrrolidones and propionamides as a mixture, or the composition containing the amino alcohol reaction product produced as described above, is added and stirred to obtain the one-component aqueous composition. The stirring process is advantageously performed at room temperature. Advantageously, stirring is performed for a certain time period to obtain a homogeneous mixture.

The composition according to the invention containing the emulsifier selected from of pyrrolidones and propionamides as a mixture or the composition containing the amino alcohol reaction product is also suitable as silane component A for a two-component aqueous adhesive promoter composition comprising an aqueous component B as the second, separate component. The aqueous component B contains preferably at least one surfactant, at least one acid and optionally a water-soluble adhesive promoter additive. The aqueous component B can be produced in the same way for this purpose as the aqueous component for the one-component aqueous composition.

The one- or two-component aqueous composition according to the invention is especially suitable as an adhesive promoter or primer, especially as a primer for adhesives and sealants. The use of a primer of this type improves the adhesion.

Basically any adhesive can be used as the adhesive. Advantageous improvements in adhesion are especially seen with polyurethane adhesives, especially those having isocyanate group-containing polyurethane prepolymers. Polyurethane adhesives of this type are widely available commercially, e.g., Sikaflex® from Sika Schweiz AG. The aqueous composition according to the invention is especially suitable for 1K polyurethane adhesives.

Thus, a suitable method for bonding or sealing two or more substrates is one in which the aqueous adhesive promoter composition according to the invention is applied as a pretreatment to at least one substrate and flashed off. Then, the substrates are bonded or sealed with an adhesive or sealant, preferably a 1K polyurethane adhesive.

The substrates can be of many different types. Preferably, at least one of the substrates to be pretreated with the aqueous adhesive promoter composition according to the invention is glass or glass ceramic or aluminum or an aluminum alloy. Also suitable are substrates made of silver, especially a silver imprint on glass or glass ceramic.

The aqueous composition according to the invention is particularly suitable as pretreatment for bonding windshields, especially in vehicle manufacturing or for direct glazing. Therefore, in a preferred embodiment, one substrate is glass or glass ceramic and the second substrate is a paint or a painted metal or a painted metal alloy.

The use of mercaptosilanes in the aqueous composition leads to a pronounced improvement in adhesion of 1K polyurethane adhesives on silver or on silver based compositions or alloys. It has been found that the method described is especially suitable for bonding windshields with integrated antenna or other electronic components. Such antenna connection contacts or other electronic components are typically made of silver or silver-based compositions or alloys applied to the windshield.

In this manner bonded or sealed-off articles are produced. Such articles are especially transport means, especially an automobile, bus, truck, rail vehicle, a ship or an aircraft.

EXAMPLES

The invention will be further explained by the examples that follow, which are not intended to limit the invention in any way. Unless stated otherwise, all data are by weight.

Raw materials used:

| | |
|---|---|
| Silquest A1120 | N-(2-aminoethyl)-3-aminopropyl-trimethoxysilane Silquest ® A1120, GE Silicones, Switzerland |
| Silquest A1170 | bis(trimethoxysilylpropyl)amine Silquest ® A1170, GE Silicones, Switzerland |
| Silquest A189 | 3-mercaptopropyl-trimethoxysilane Silquest ® A189, GE Silicones, Switzerland |
| Hydropalat 3037 | Surfactant, modified natural oil, silicone-free, Hydropalat ® 3037, Cognis, Germany |
| Hydrosil 2776 | Adhesive promoter additive, reactive organofunctional siloxane oligomer, Dynasylan ® Hydrosil 2776, Evonik Industries, Germany |
| CHP | N-cyclohexyl-2-pyrrolidone |

Examples 1 and 2

Based on the substances and quantities listed in Table 1, silane components 1 and 2 (S1 and S2) and an aqueous component 1 and 2 (W1 and W2) were produced as follows. The data in the table are in wt.-%, based on the respective component.

Then, the silane component 1 and the aqueous component 1 and the silane component 2 and the aqueous component 2 were mixed, as stated below, to obtain the one-component aqueous compositions 1 and 2 (M1 and M2). In Table 1, the quantitative fractions of the individual components of compositions M1 and M2 are presented in wt.-%, based on the total mixture.

TABLE 1

|  | Example 1 | | Example 2 | |
| --- | --- | --- | --- | --- |
|  | W1 | M1 | W2 | M2 |
| Deionized water | 94.7 | 92.33 | 93.97 | 91.62 |
| Hydropalat 3037 | 0.3 | 0.29 | 4.01 | 3.91 |
| Acetic acid | 4 | 3.90 | 0.96 | 0.94 |
| Hydrosil 2776 | 1 | 0.97 | 1.06 | 1.03 |
| Total | 100 |  | 100 |  |
|  | S1 | | S2 | |
| Silquest A 1120 | 20 | 0.50 | 20 | 0.50 |
| Silquest A 1170 | 30 | 0.75 | 30 | 0.75 |
| Silquest A 189 | 10 | 0.25 | 10 | 0.25 |
| CHP | 40 | 1.00 | — | — |
| Diethylene glycol amine | — | — | 40 | 1.00 |
| Total | 100 | 100 | 100 | 100 |

Example 1

Preparation of Silane Component 1 (S1)

Cyclohexyl pyrrolidone (CHP) was mixed well with the aminosilanes (Silquest A 1120 and Silquest A 1170) and the mercaptosilane (Silquest A 189). The total entire procedure was performed at 23° C. under nitrogen. A clear colorless mixture was obtained.

Preparation of Aqueous Component 1 (W1) and One-Component Composition 1 (M1)

The entire procedure took place at 23° C. while stirring slowly. Water is placed in a reactor. Hydropalat 3037 is added and stirring is continued until all is dissolved. Then, acetic acid is added and the mixture is stirred for 30 min. Hydrosil 2776 is added to the mixture and it is stirred for 15 min. To 97.5 parts by weight of the aqueous component 1 (W1) thus obtained, 2.5 parts by weight of the previously produced silane component 1 (Si) are added and mixed for 15 min to obtain the one-component composition 1 (M1).

Example 2

Production of Silane Component 2 (S2)

The aminosilanes (Silquest A 1120 and Silquest A 1170) and the mercaptosilane (Silquest A 189) were placed in a reactor. The mixture was stirred and diethylene glycol amine was added slowly. As soon as the entire amount of diethylene glycol amine was present in the mixture, the reactor was heated to 90° C. Any methanol that formed was distilled off from the mixture. As soon as all of the methanol formed had been removed (about 2 h), the clear solution was cooled to room temperature. The entire procedure took place under nitrogen.

Preparation of Aqueous Component 2 (W2) and One-Component Composition 2 (M2)

The entire procedure took place at 23° C. under slow stirring. Water is placed in a reactor. Hydropalat 3037 is added and stirring is continued until it is completely dissolved. Then, acetic acid is added and the mixture is stirred for 30 min. Hydrosil 2776 is added to the mixture and it is stirred for 15 min. To 97.5 parts by weight of aqueous component 2 (W2) thus obtained, 2.5 parts by weight of the previously produced silane component (S2) are added and mixed for 15 min to obtain the one-component aqueous composition 2 (M2).

Comparison Example

The silane component of the commercially available standard adhesive promoter Sika HydroPree-100 from Sika Schweiz AG was used as silane component 3, which is based on the aminosilanes and mercaptosilanes used in examples 1 and 2 but contains no emulsifier according to examples 1 or 2. The aqueous component 3 is the aqueous component of this standard adhesive promoter and resembles the aqueous components of examples 1 and 2. An aqueous composition 3 is obtained by mixing the silane component 3 and the aqueous component 3.

Testing

The aqueous compositions 1 to 3 formed according to examples 1 and 2 and the comparison example were tested with respect to their storage stability on various substrates as adhesive promoters in combination with various adhesives. For this purpose, the aqueous compositions were used after production (fresh) and 3, 6 and 12 months after preparation.

Sikaflex®-250 DM-3 (DM3), Sikaflex®-250 DB-2 (DB2) and Sikaflex®-265 DG-3 (DG3) were used as the adhesives. These are one-component moisture-curing polyurethane adhesives that contain polyurethane prepolymers with isocyanate groups and are commercially available from Sika Schweiz AG.

Substrates used were the float glasses Ferro Frit 14251, Ferro Frit 3402 and Ferro Frit 14279. The glass substrates mentioned are sold by Rocholl AG. They are laboratory substrates that correspond to the usual marketed glass ceramics for VSG and ESG glasses. Ferro is the manufacturer of the glass ceramic paste; the numbers are the type designations of the ceramics used.

The aqueous compositions were applied to the respective substrate using a cellulose cloth (Tela®, Tela-Kimberly Switzerland GmbH) soaked with them and flashed off for 10 minutes. A triangular bead of the adhesive was applied using a pressure cartridge with nozzle at 23° C. and 50% rel. humidity.

The adhesive was tested after a curing time of 7 days in a climate-controlled chamber (23° C., 50% relative humidity) (RT), and after subsequent storage in water (WL) at 23° C. for 7 days, and then after cataplasma storage (CP) for 7 days at 70° C., 100% rel. humidity.

The adhesion of the adhesive was tested using the "bead test". For this purpose a notch is cut into the bead at the end just above the adhesive surface. The notched end of the bead is held with round-nose pliers and pulled off the substrate. This is done by carefully rolling up the bead on the tip of the pliers and applying a cut on the blank substrate perpendicular to the bead pulling direction. The pulling rate of the bead is to be selected such that a cut must be made about every 3 seconds. The test section must correspond to at least 8 cm. The amount of adhesive remaining on the substrate after pulling off the bead (cohesive fracture) is measured. The adhesive properties are evaluated by visual determination of the cohesive part of the adhesion surface.

The higher is the fraction of cohesive fracture, the better the bond is assessed to be. Test results with cohesive fractures of less than 70% are typically considered inadequate. The results are summarized in Table 2.

TABLE 2

| Pretreatment | Substrate | fresh RT | fresh WL | fresh CP | 3 months (RT) RT | 3 months (RT) WL | 3 months (RT) CP | 6 months (RT) RT | 6 months (RT) WL | 6 months (RT) CP | 12 months (RT) RT | 12 months (RT) WL | 12 months (RT) CP |
|---|---|---|---|---|---|---|---|---|---|---|---|---|---|
| | | | | | SikaFlex-250 DM-3 | | | | | | | | |
| Comparison example | Glass | 100 | 98 | 100 | 100 | 95 | 100 | 98 | 60 | 98 | 100 | 100 | 100 |
| | Ferro Frit 14251 | 100 | 100 | 90 | 100 | 100 | 30 | 85 | 85 | 80 | 100 | 100 | 20 |
| | Ferro Frit 3402 | 100 | 100 | 100 | 98 | 30 | 98 | 80 | 5 | 100 | 100 | 50 | 90 |
| | Ferro Frit 14279 | 100 | 95 | 100 | 100 | 100 | 100 | 100 | 100 | 100 | 100 | 85 | 100 |
| inadequate adhesion results (per 12) | | | 0 | | | 2 | | | 2 | | | 2 | |
| Example 1 | Glass | 100 | 100 | 100 | 100 | 100 | 98 | 100 | 95 | 100 | 100 | 75 | 100 |
| | Ferro Frit 14251 | 100 | 100 | 30 | 100 | 100 | 90 | 98 | 100 | 80 | 100 | 100 | 75 |
| | Ferro Frit 3402 | 100 | 100 | 100 | 100 | 100 | 100 | 100 | 100 | 100 | 100 | 100 | 100 |
| | Ferro Frit 14279 | 100 | 100 | 100 | 95 | 75 | 100 | 100 | 80 | 90 | 98 | 40 | 100 |
| inadequate adhesion results (per 12) | | | 1 | | | 0 | | | 0 | | | 1 | |
| Example 2 | Glass | 100 | 90 | 100 | 100 | 75 | 100 | 100 | 75 | 100 | 100 | 40 | 100 |
| | Ferro Frit 14251 | 100 | 100 | 100 | 100 | 100 | 100 | 100 | 100 | 100 | 100 | 100 | 100 |
| | Ferro Frit 3402 | 100 | 100 | 100 | 100 | 100 | 100 | 100 | 100 | 100 | 100 | 90 | 100 |
| | Ferro Frit 14279 | 100 | 100 | 100 | 100 | 100 | 100 | 95 | 75 | 100 | 100 | 100 | 100 |
| inadequate adhesion results (per 12) | | | 0 | | | 0 | | | 0 | | | 1 | |
| | | | | | SikaFlex-250 DB-2 | | | | | | | | |
| Comparison example | Glass | 100 | 100 | 100 | 100 | 60 | 100 | 98 | 20 | 100 | 100 | 50 | 100 |
| | Ferro Frit 14251 | 100 | 100 | 100 | 100 | 100 | 100 | 100 | 100 | 100 | 100 | 100 | 100 |
| | Ferro Frit 3402 | 100 | 98 | 95 | 98 | 20 | 90 | 10 | 5 | 100 | 100 | 0 | 20 |
| | Ferro Frit 14279 | 100 | 100 | 100 | 100 | 100 | 100 | 100 | 5 | 100 | 100 | 95 | 100 |
| inadequate adhesion results (per 12) | | | 0 | | | 2 | | | 4 | | | 3 | |
| Example 1 | Glass | 100 | 100 | 100 | 100 | 30 | 100 | 100 | 75 | 100 | 100 | 30 | 100 |
| | Ferro Frit 14251 | 100 | 100 | 100 | 100 | 100 | 100 | 100 | 100 | 100 | 100 | 100 | 100 |
| | Ferro Frit 3402 | 100 | 100 | 100 | 100 | 100 | 100 | 100 | 90 | 100 | 100 | 95 | 95 |
| | Ferro Frit 14279 | 100 | 100 | 100 | 100 | 95 | 100 | 100 | 98 | 40 | 100 | 75 | 100 |
| inadequate adhesion results (per 12) | | | 0 | | | 1 | | | 1 | | | 1 | |
| Example 2 | Glass | 100 | 100 | 100 | 100 | 75 | 100 | 100 | 75 | 100 | 100 | 30 | 100 |
| | Ferro Frit 14251 | 100 | 100 | 100 | 100 | 100 | 100 | 100 | 100 | 100 | 100 | 100 | 100 |
| | Ferro Frit 3402 | 100 | 100 | 100 | 98 | 75 | 98 | 100 | 90 | 100 | 98 | 30 | 80 |
| | Ferro Frit 14279 | 100 | 100 | 100 | 100 | 100 | 100 | 100 | 40 | 100 | 100 | 98 | 100 |
| inadequate adhesion results (per 12) | | | 0 | | | 0 | | | 1 | | | 2 | |
| | | | | | Sikaflex-265 DG3 | | | | | | | | |
| Comparison example | Glass | 100 | 100 | 100 | 100 | 85 | 100 | 60 | 60 | 100 | 100 | 60 | 100 |
| | Ferro Frit 14251 | 100 | 100 | 100 | 100 | 100 | 100 | 100 | 100 | 100 | 100 | 50 | 100 |
| | Ferro Frit 3402 | 100 | 100 | 100 | 95 | 30 | 100 | 60 | 5 | 100 | 100 | 30 | 100 |
| | Ferro Frit 14279 | 100 | 100 | 100 | 100 | 100 | 100 | 100 | 60 | 100 | 100 | 100 | 100 |
| inadequate adhesion results (per 12) | | | 0 | | | 1 | | | 5 | | | 3 | |
| Example 1 | Glass | 100 | 80 | 100 | 100 | 40 | 100 | 100 | 75 | 100 | 100 | 40 | 95 |
| | Ferro Frit 14251 | 100 | 100 | 100 | 100 | 100 | 100 | 100 | 100 | 100 | 100 | 100 | 100 |
| | Ferro Frit 3402 | 100 | 100 | 100 | 100 | 100 | 100 | 100 | 100 | 100 | 100 | 75 | 100 |
| | Ferro Frit 14279 | 100 | 100 | 100 | 100 | 100 | 100 | 100 | 100 | 100 | 100 | 100 | 100 |
| inadequate adhesion results (per 12) | | | 0 | | | 1 | | | 0 | | | 1 | |
| Example 2 | Glass | 100 | 95 | 100 | 100 | 80 | 100 | 95 | 30 | 100 | 100 | 75 | 100 |
| | Ferro Frit 14251 | 100 | 100 | 100 | 100 | 100 | 100 | 100 | 100 | 100 | 100 | 100 | 100 |
| | Ferro Frit 3402 | 100 | 75 | 100 | 100 | 75 | 100 | 100 | 98 | 100 | 90 | 10 | 100 |
| | Ferro Frit 14279 | 100 | 95 | 100 | 100 | 100 | 100 | 98 | 100 | 100 | 100 | 100 | 100 |
| inadequate adhesion results (per 12) | | | 0 | | | 0 | | | 1 | | | 1 | |

In Tables 3 to 5 the numbers of inadequate adhesion results are listed as in Table 2 for the various product ages and adhesives.

TABLE 3

Sikaflex-250 DM-3

| Product age (months) | Comparison example | Example 1 | Example 2 |
|---|---|---|---|
| 0.1 | 0 | 1 | 0 |
| 3 | 2 | 0 | 0 |
| 6 | 2 | 0 | 0 |
| 12 | 2 | 1 | 1 |

TABLE 4

Sikaflex-250 DB-2

| Product age (months) | Comparison example | Example 1 | Example 2 |
|---|---|---|---|
| 0.1 | 0 | 0 | 0 |
| 3 | 2 | 1 | 0 |
| 6 | 4 | 1 | 1 |
| 12 | 3 | 1 | 2 |

TABLE 5

| | Sikaflex-265 DG-3 | | |
| --- | --- | --- | --- |
| Product age (months) | Comparison example | Example 1 | Example 2 |
| 0.1 | 0 | 0 | 0 |
| 3 | 1 | 1 | 0 |
| 6 | 5 | 0 | 1 |
| 12 | 3 | 1 | 1 |

It is clearly apparent from the results that the aqueous adhesive promoter compositions according to the invention achieve good results even after prolonged storage, whereas the standard adhesive promoter used for comparison exhibits a deterioration in performance with increasing storage time.

The invention claimed is:

1. A composition consisting essentially of:
A) at least one aminosilane which has at least one hydrolyzable group bonded to Si,
B) at least one mercaptosilane which has at least one hydrolyzable group bonded to Si,
C) at least one emulsifier selected from propionamides and amino alcohol reaction products,
wherein, if the at least one emulsifier is an amino alcohol reaction product, the amino alcohol reaction product is a reaction product of an amino alcohol and at least part of the aminosilane and/or mercaptosilane, and in the amino alcohol reaction product, at least some of the hydrolyzable groups present in the at least one aminosilane and the at least one mercaptosilane are replaced by an amino alcoholate group present in the amino alcohol,
D) hydrolysis and/or condensation products of the at least one aminosilane and the at least one mercaptosilane,
E) water,
F) at least one acid, and
G) at least one surfactant.

2. The composition according to claim 1, wherein the at least one emulsifier is selected from
a propionamide of formula $R^6$—C(O)$NR^7{}_2$, wherein $R^6$ is a substituted or unsubstituted ethyl group and $R^7$ is independently of one another H or a $C_{1-4}$-alkyl group, and
an amino alcohol reaction product formed from an amino alcohol selected from the group consisting of ethanolamine, diethylene glycol amine, N-(β-aminoethyl) aminoethanol, diethanolamine, and N-methyldiethanolamine.

3. The composition according to claim 2, wherein the at least one emulsifier is an amino alcohol reaction product formed from diethylene glycol amine.

4. The composition according to claim 1, wherein the at least one emulsifier includes the amino alcohol reaction product, and based on a total amount of the aminosilanes and the mercaptosilanes in the composition, a molar ratio of: (1) the hydrolyzable groups and the amino alcoholate groups bonded to Si to (2) the amino alcoholate groups bonded to Si is in a range of from 1:1 to 10:1.

5. The composition according to claim 1, wherein the aminosilane is an aminosilane of formula (I),

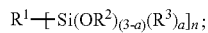
(I)

the mercaptosilane is a mercaptosilane of formula (II),

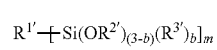
(II)

wherein in formulas (I) and (II)
$R^1$ represents an n-valent organic radical with at least one primary and/or secondary amino group,
$R^{1'}$ represents an m-valent organic radical with at least one mercapto group,
$R^2$ and $R^{2'}$ independently of one another represent an alkyl group with 1 to 4 C atoms or an acyl group;
$R^3$ and $R^{3'}$ independently of one another represent H or an alkyl group with 1 to 10 C atoms;
a and b independently of one another represent a value of 0, 1 or 2; and
n and m independently of one another represent the values 1, 2, 3 and 4.

6. The composition according to claim 1, wherein the composition is a one-component aqueous composition, or a two-component aqueous composition including a silane component A and an aqueous component B.

7. The composition according to claim 6, wherein in the two-component aqueous composition, the aqueous component B includes the acid, and the silane component A and/or the aqueous component B includes the surfactant.

8. A composition consisting essentially of:
A) at least one aminosilane which has at least one hydrolyzable group bonded to Si,
B) at least one mercaptosilane which has at least one hydrolyzable group bonded to Si,
C) at least one emulsifier selected from propionamides and amino alcohol reaction products,
wherein, if the at least one emulsifier is an amino alcohol reaction product, the amino alcohol reaction product is a reaction product of an amino alcohol and at least part of the aminosilane and/or mercaptosilane, and in the amino alcohol reaction product, at least some of the hydrolyzable groups present in the at least one aminosilane and the at least one mercaptosilane are replaced by an amino alcoholate group of the amino alcohol,
D) hydrolysis and/or condensation products of the at least one aminosilane and the at least one mercaptosilane,
E) water,
F) at least one acid,
G) at least one surfactant, and
H) at least one water-soluble adhesive promoter additive.

9. The composition according to claim 1, wherein the emulsifier is propionamides, and a content of the propionamides, based on a total weight of the composition, is in a range of from 0.1 to 10 wt.-%.

10. A method for producing the composition according to claim 1, comprising:
(1) mixing:
a) the at least one aminosilane which has at least one hydrolyzable group bonded to Si,
b) the at least one mercaptosilane which has at least one hydrolyzable group bonded to Si,
c) at least one compound selected from propionamides and amino alcohols as the emulsifier or an emulsifier precursor,
(2) with the proviso that the emulsifier precursor is an amino alcohol: (i) heating the resulting mixture to react the amino alcohol with the aminosilane and the mercaptosilane to form the amino alcohol reaction product in which at least some of the hydrolyzable groups present in the at least one aminosilane and the at least one mercaptosilane are replaced by the amino alcoholate group of the amino alcohol, and (ii) removing a byproduct formed during the heating from the mixture, and (3) mixing the resulting mixture with an aqueous component containing the water, the at least one acid, and the at least one surfactant to form the hydrolysis and/or condensation products of the at least one aminosilane and the at least one mercaptosilane.

11. The method according to claim 10, wherein the emulsifier precursor is the amino alcohol, a total amount of the aminosilane and the mercaptosilane relative to an amount of the amino alcohol is such that a molar ratio of: (1) the hydrolyzable groups bonded to Si to (2) hydroxyl groups present in the amino alcohol is in a range of from 1:1 to 10:1.

12. A method for treating a substrate prior to applying an adhesive, the method comprising:
applying aqueous composition according to claim 6 on the substrate.

13. A direct glazing method, comprising:
applying the aqueous composition according to claim 6 on at least one of a first substrate and a second substrate, wherein the first substrate is a glass or a glass ceramic.

14. The composition according to claim 8, wherein the composition is a one-component aqueous composition, or a two-component aqueous composition including a silane component A and an aqueous component B.

15. The composition according to claim 14, wherein in the two-component aqueous composition, the aqueous component B includes the acid, and the silane component A and/or the aqueous component B includes the surfactant.

16. The composition according to claim 14, wherein the aqueous component B includes the water-soluble adhesive promoter additive.

17. The composition according to claim 4, wherein the molar ratio is in a range of from 10:5 to 10:2.

18. The composition according to claim 9, wherein the content of the propionamides is in a range of from 0.5 to 2 wt. %.

19. The composition according to claim 8, wherein the at least one emulsifier includes the amino alcohol reaction product, and based on a total amount of the aminosilanes and the mercaptosilanes in the composition, a molar ratio of: (1) the hydrolyzable groups and the amino alcoholate groups bonded to Si to (2) the amino alcoholate groups bonded to Si is in a range of from 10:1.

20. The composition according to claim 18, wherein the molar ratio is in a range of from 10:5 to 10:2.

* * * * *

UNITED STATES PATENT AND TRADEMARK OFFICE
CERTIFICATE OF CORRECTION

| | |
|---|---|
| PATENT NO. | : 10,428,223 B2 |
| APPLICATION NO. | : 14/765593 |
| DATED | : October 1, 2019 |
| INVENTOR(S) | : Dohner et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 140 days.

Signed and Sealed this
Eleventh Day of August, 2020

Andrei Iancu
*Director of the United States Patent and Trademark Office*